United States Patent
Liu et al.

(10) Patent No.: US 9,952,373 B2
(45) Date of Patent: Apr. 24, 2018

(54) LIGHT SOURCE MODULE AND DISPLAY APPARATUS

(71) Applicant: Young Lighting Technology Inc., Hsin-Chu (TW)

(72) Inventors: Chin-Ku Liu, Hsin-Chu (TW); Jhong-Hao Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 15/365,866

(22) Filed: Nov. 30, 2016

(65) Prior Publication Data
US 2017/0160461 A1    Jun. 8, 2017

(30) Foreign Application Priority Data
Dec. 4, 2015  (TW) .............................. 104140684 A

(51) Int. Cl.
*F21V 8/00*    (2006.01)

(52) U.S. Cl.
CPC ......... *G02B 6/0031* (2013.01); *G02B 6/0026* (2013.01); *G02B 6/0046* (2013.01)

(58) Field of Classification Search
CPC .. G02B 6/0013; G02B 6/0016; G02B 6/0023; G02B 6/0026; G02B 6/0031
USPC ................ 362/608, 609, 612, 613, 615–629
See application file for complete search history.

(56) References Cited

U.S. PATENT DOCUMENTS

| | | | | |
|---|---|---|---|---|
| 7,218,830 B2* | 5/2007 | Iimura | ................. | G02B 6/0018 362/610 |
| 7,481,566 B2* | 1/2009 | Han | .................... | G02B 6/0025 362/342 |
| 8,827,530 B2* | 9/2014 | Chang | ................. | G02B 6/0028 362/608 |
| 2004/0130880 A1 | 7/2004 | Min et al. | | |
| 2006/0109684 A1* | 5/2006 | Nesterenko | .......... | G02B 6/0018 362/610 |
| 2008/0055928 A1* | 3/2008 | Arai | .................... | G02B 6/0016 362/609 |
| 2013/0028558 A1 | 1/2013 | Jenkins | | |
| 2013/0271700 A1* | 10/2013 | Nakamura | .......... | G02B 6/0026 349/65 |
| 2014/0286044 A1 | 9/2014 | Johnson et al. | | |
| 2015/0355400 A1* | 12/2015 | Li | .................... | G02F 1/133608 349/62 |

(Continued)

FOREIGN PATENT DOCUMENTS

CN    102011981    6/2012
CN    104180241    12/2014

(Continued)

*Primary Examiner* — Laura Tso
(74) *Attorney, Agent, or Firm* — JCIPRNET

(57) ABSTRACT

A light source module including a light guide plate, a light source set and a light modulating device is provided. The light guide plate includes a light entering surface. The light source set is disposed beside the light entering surface. The light-source is adapted to emit a first light beam. The light modulating device is disposed between the light source set and the light guide plate. The light modulating device includes a light reflection portion. The first light enters the light entering surface through the light modulating device, and the light modulating device makes the divergence angle of the first light converge.

9 Claims, 10 Drawing Sheets

(56) References Cited

U.S. PATENT DOCUMENTS

2017/0160459 A1    6/2017  Liu et al.

FOREIGN PATENT DOCUMENTS

| TW | 201213965 | 4/2012 |
| TW | 201232126 | 8/2012 |
| TW | 201312226 | 3/2013 |
| TW | 201331646 | 8/2013 |
| TW | 201411248 | 3/2014 |
| TW | 201516492 | 5/2015 |

* cited by examiner

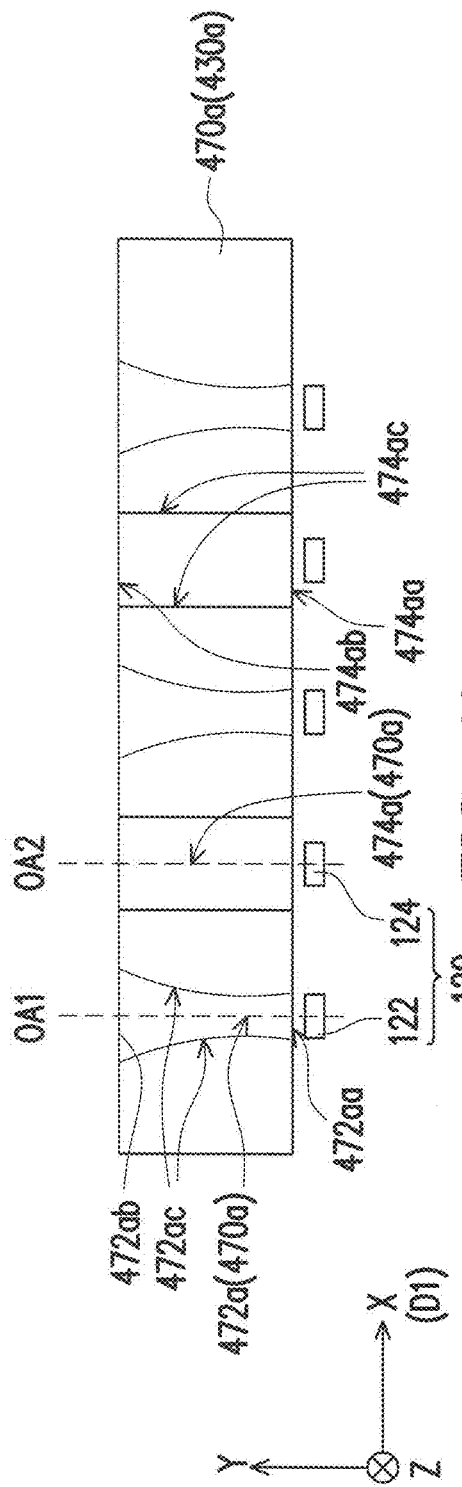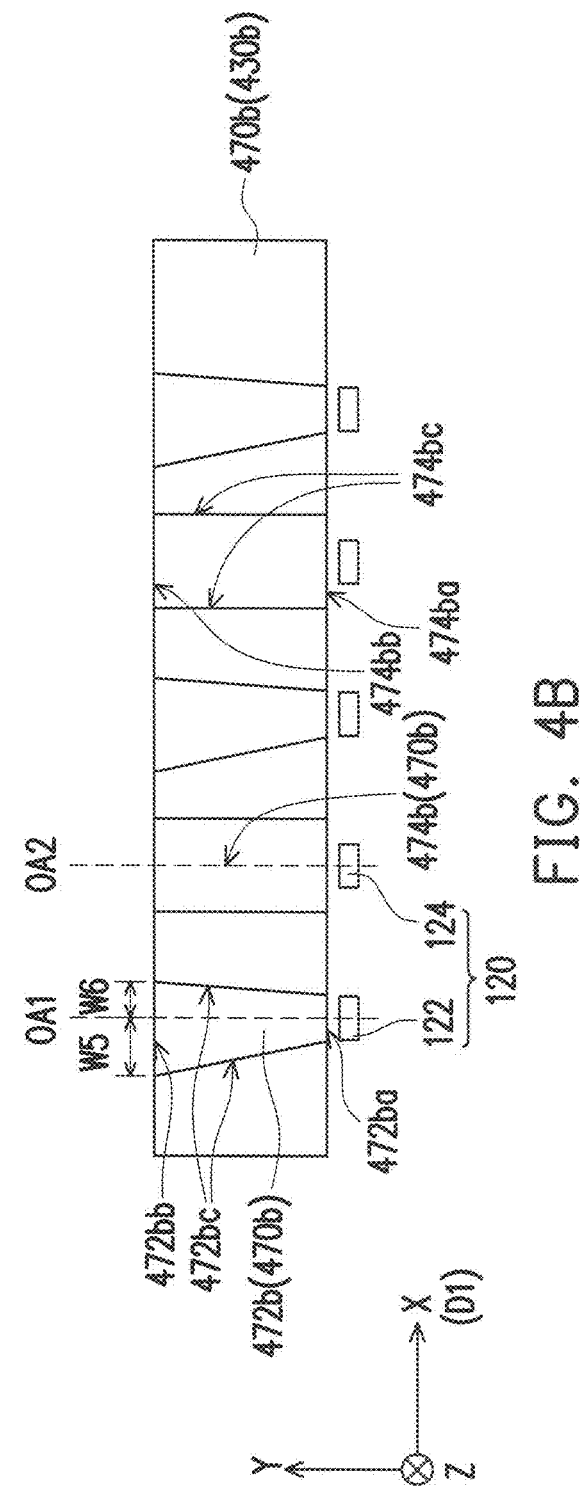

LIGHT SOURCE MODULE AND DISPLAY APPARATUS

CROSS-REFERENCE TO RELATED APPLICATION

This application claims the priority benefit of Taiwan application serial no. 104140684, filed on Dec. 4, 2015. The entirety of the above-mentioned patent application is hereby incorporated by reference herein and made a part of this specification.

BACKGROUND OF THE INVENTION

Field of the Invention

The invention relates to a light source module and a display apparatus, and particularly relates to a light source module and a display apparatus having a light modulating device.

Description of Related Art

Liquid crystal displays (LCD) have been broadly applied in various aspects of our daily life, such as being applied in informational household appliances including notebooks, liquid crystal monitors, portable consumer audio-video products, mobile phones, and liquid crystal TVs, etc. Since the display panel in a liquid crystal display does not emit light, the light source module that provides light is a key component of the liquid crystal display.

In relevant research on displays in recent years, the anti-spy function of displays becomes more and more important. Since users hope that, when using relevant products, the individual privacy may also be protected, more and more people add an anti-spy function to their screens. Also, the products suitable for adding the anti-spy capability expand further from notebook computers and liquid crystal monitors to portable consumer audio-video products, such as mobile phones and tablets, etc. Currently, the main stream of the anti-spy design is to add an anti-spy film to shield a large angular beam, so as to prevent others from viewing. However, such anti-spy film makes the brightness in the front view lower and reduces the display sharpness. Also, the user must carry the anti-spy film all the time, making it inconvenient to use. Alternatively, some technologies utilize the spirality of twist nematic (TN) liquid crystal in different blocks of the screen, such that the viewer may perceive different brightnesses at different angles, thereby accomplishing the effect of anti-spy. However, controlling the liquid crystal molecules to have different inclination angles in different display areas make the manufacturing process more difficult. Another alternative is to utilize the optical properties of the vertical aligned (VA) liquid crystal to produce a designed anti-spy pattern on the mobile phone to interfere others' viewing. However, such technology makes the brightness of the mobile phone lower, and the designed anti-spy pattern is unable to completely shield the contents being displayed. Thus, the anti-spy effect of the display is not desirable.

The information disclosed in the "BACKGROUND OF THE INVENTION" section is only for enhancement of understanding of the background of the described technology, and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a light source module. Light emitted by the light source module has a smaller divergence angle, so as to provide an anti-spy effect to a display apparatus.

The invention provides a display apparatus having an anti-spy effect.

Other objects and advantages of the present invention can be further illustrated by the technical features broadly embodied and described as follows.

In order to achieve one or a portion of or all of the objects or other objects, one embodiment of the invention provides a light source module. The light source module includes a light guide plate, a light source set, and a light modulating device. The light guide plate includes a light entering surface. The light source set is disposed beside the light entering surface. The light source set is adapted to emit a first light beam. The light modulating device is disposed between the light source set and the light guide plate. The light modulating device includes a light reflection portion. The first light beam passes through the light modulating device and enters the light entering surface, and the light modulating device makes a divergence angle of the first light beam converge.

In order to achieve one or a portion of or all of the objects or other objects, one embodiment of the invention provides a display apparatus. The display apparatus includes a display panel and a light source module. The light source module is adapted to provide the light beam to the display panel. The light source module includes a light guide plate, a light source set, and a light modulating device. The light guide plate includes a light entering surface. The light source set is disposed beside the light entering surface. The light source set is adapted to emit a first light beam. The light modulating device is disposed between the light source set and the light guide plate. The light modulating device includes a light reflection portion. The first light beam passes through the light modulating device and enters the light entering surface, and the light modulating device makes a divergence angle of the first light beam converge.

Based on above, the embodiments of the invention at least have one of the following characteristics or effects. In the light source module and the display apparatus according to the embodiments of the invention, the light modulating device includes the light reflection portion. The first light beam emitted by the light source set enters the light entering surface of the light guide plate through the light modulating device, and the light modulating device makes the divergence angle of the first light beam converge. Thus, the light source module according to the embodiments of the invention may provide the anti-spy effect to a display apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 4A is a schematic cross-sectional top view illustrating a light modulating device according to another embodiment of the invention.

FIG. 4B is a schematic cross-sectional top view illustrating a light modulating device according to yet another embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
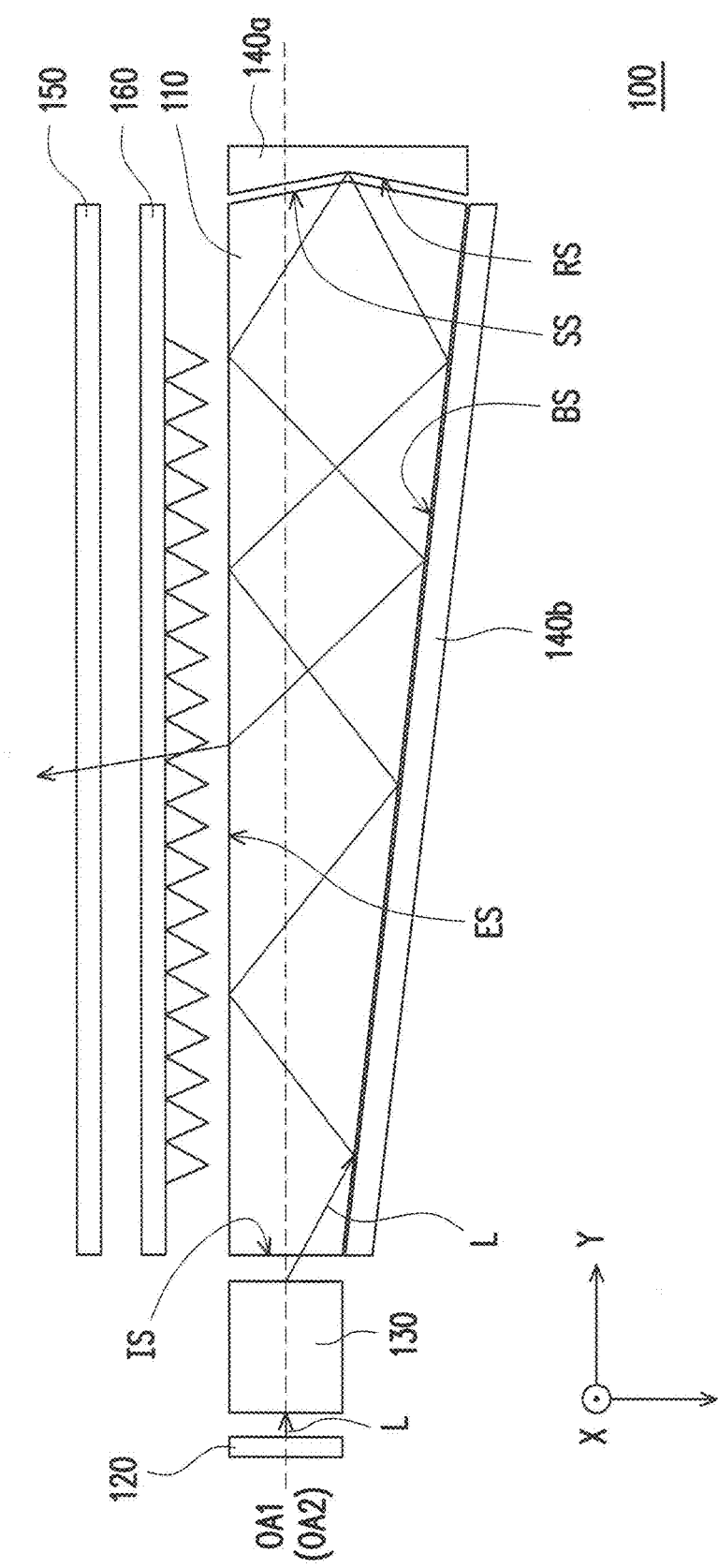
FIG. 1A is a schematic cross-sectional side view illustrating a light source module according to an embodiment of the invention.

FIG. 1A is a schematic cross-sectional side view illustrating a light source module according to an embodiment of the invention. Referring to FIG. 1, in this embodiment, a light source module 100 includes a light guide plate 110, a light source set 120, and a light modulating device 130. The light guide plate 110 includes a light entering surface IS. The light source set 120 is disposed beside the light entering surface IS. The light modulating device 130 is disposed between the light source set 120 and the light guide plate 110. Specifically, the light guide plate 110 further includes a light emitting surface ES, a bottom surface BS opposite to the light emitting surface ES, and a side surface SS opposite to the light entering surface IS. The light entering surface IS is between the light emitting surface ES and the bottom surface BS, and the light entering surface IS is connected to the light emitting surface ES and the bottom surface BS. The side surface SS is located between the light emitting surface ES and the bottom surface BS, and the side surface SS is connected to the light emitting surface ES and the bottom surface BS. In this embodiment, the light guide plate 110 is a reflective wedge light guide plate, for example. A thickness of the light guide plate 110 gradually decreases from the side surface SS toward the light entering surface IS, for example. In other embodiments, the light guide plate 110 may also be a light guide plate disposing a micro-structure on the bottom surface BS or other types of light guide plates, for example. The invention does not intend to impose a limitation in this regard.

Figure 1B:
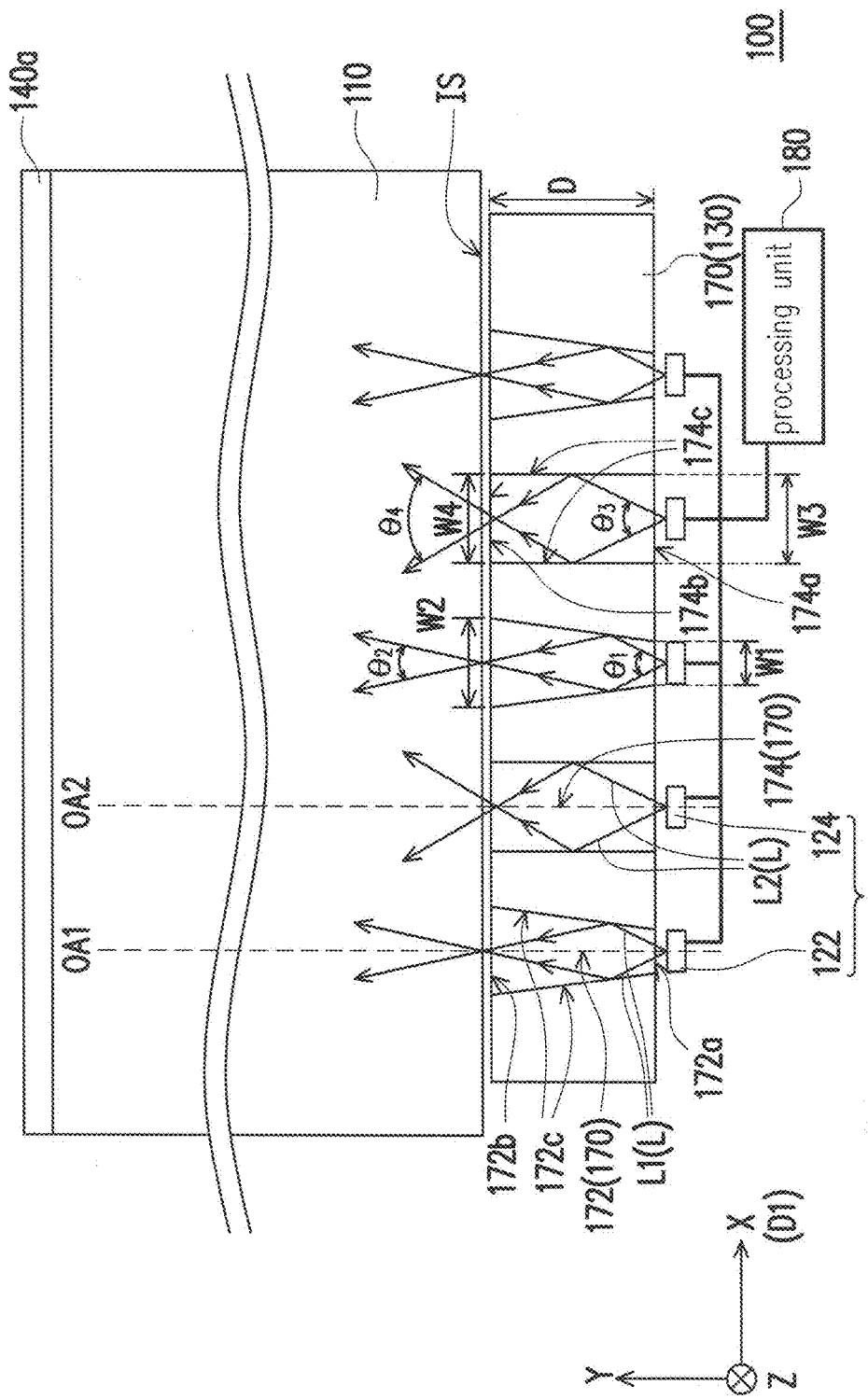
FIG. 1B is a schematic cross-sectional top view illustrating the light source module of the embodiment shown in FIG. 1A.

FIG. 1B is a schematic cross-sectional top view illustrating the light source module of the embodiment shown in FIG. 1A. Referring to FIG. 1A at the same time, in this embodiment, the light source module 100 further includes a reflection device 140a, a reflection device 140b, a diffusion sheet 150, and a prism sheet 160. The light source 120 and the reflection device 140a are disposed at opposite sides of the light guide plate 110, and the reflection device 140a includes a reflection surface RS facing the light guide plate 110. More specifically, a shape of the reflection surface RS corresponds to a shape of a profile of the side surface SS of the light guide plate 110. For example, in this embodiment, the shape of the side surface SS of the light guide plate 110 is a trigonal plane, and the shape of the reflection surface RS corresponds to the profile of the side surface SS of the light guide plate 110 to exhibit a recessed shape. In this embodiment, the prism 160 is disposed at the side of the light emitting surface ES of the light guide plate 110, and a surface of the prism sheet 160 where a prism is provided faces the light emitting surface ES. In addition, the prism sheet 160 is disposed between the light guide plate 110 and the diffusion sheet 150, and the reflection device 140b is disposed at a side of the bottom surface BS of the light guide plate 110. In this embodiment, the reflection device 140b is a white reflection sheet, a mirror reflection sheet, or other types of reflection sheets, or a metal backplane having a reflection effect. However, the invention is not limited thereto. Specifically, the light source set 120 includes at least one first light source 122 and at least one second light source 124. The first light source 122 and the secondlight source 124 respectively have an optical axis OA1 and an optical axis OA2 parallel to each other. The light source module 100 is located in a space built with a first axis X, a second axis Y, and a third axis Z. In addition, a direction of the second axis Y is parallel with the optical axis OA1 of the first light source 122 and parallel with the optical axis OA2 of the second light source 124. A direction of the first axis X extends along a horizontal direction. The direction of the second axis Y is perpendicular to the direction of the first axis X and extends along the perpendicular direction. Moreover, a direction of the third axis Z is perpendicular to the direction of the first axis X and the direction of the second axis Y. The first light source 122 and the second light source 124 are alternately arranged along the direction of the first axis X. The first light source 122 and the second light source 124 are light emitting diodes (LEDs), for example. In other embodiments, organic light emitting diodes (OLEDs) or other types of light emitting devices may also be used based on the optical requirement of the light source module 100. The invention does not intend to impose any limitation in this regard.

In this embodiment, the light source set 120 is adapted to emit a light beam L, and the light beam L passes through the light modulating device 130 and enter the light entering surface IS. An incident angle of most of the light beam L entering the light entering surface ES and the bottom surface BS is greater than a critical angle, so as to be transmitted to the side surface SS of the light guide plate 110 through total reflection. Then, the light beam L is reflected on the reflection surface RS of the reflection device 140a to return the light guide plate 110 from the side surface SS. Since the thickness of the light guide plate 110 of this embodiment gradually decreases from the side surface SS toward the light entering surface IS, the incident angle of the light beam L returning from the side surface SS and entering the light emitting surface ES or the bottom surface BS may gradually decrease as the number of times that the light beam L is reflected by the light emitting surface ES and the bottom surface BS increases. When the incident angle of the light beam L at the light emitting surface ES is smaller than the critical angle, the light beam L may be refracted out of the light guide plate 110 at the light emitting surface ES. In addition, since the reflection device 140b is disposed at a side of the bottom surface BS of the light guide plate 110, even if the incident angle of the light beam L at the bottom surface BS is smaller than the critical angle, the light beam L may still be reflected to the light emitting surface ES through the reflection device 140b. Specifically, due to the structural design of the light guide plate, a divergence angle of the light beam L entering the light entering surface IS in the horizontal direction (in the direction of the first axis X) is close to the divergence angle of the light beam L leaving the light emitting surface ES in the horizontal direction.

In this embodiment, the diffusion sheet 150 and the prism sheet 160 are respectively used to increase an illuminating evenness and an illuminating brightness of the light beam L, such that the light source module 100 has a preferable optical effect. Specifically, based on the optical requirement, the light source 100 may also include other types of optical films, so as to make proper optical adjustment to the light beam L. The invention does not intend to impose any limitation in this regard.

Referring to FIG. 1B, in this embodiment, the light beam L includes a first light beam L1 and a second light beam L2. The first light source 122 is adapted to emit the first light beam L1, and the second light source 124 is adapted to emit the second light beam L2. The light modulating device 130 includes a light reflection portion 170. Specifically, the first light beam L1 emitted by the first light source 122 of the light source set 120 passes through the light reflection portion 170 of the light modulating device 130 to enter the light entering surface IS of the light guide plate 110, and the light modulating device 130 makes a divergence angle of the first light beam L1 converge.

In this embodiment, the light reflection portion 170 includes at least one first reflection cavity 172. Each first reflection cavity 172 corresponds to one first light source 122. Specifically, each first reflection cavity 172 includes a first modulating light entering surface 172a, a first modulating light emitting surface 172b, and a plurality of first reflection side surfaces 172c connecting the first modulating light entering surface 172a and the first modulating light emitting surface 172b. The first modulating light entering surface 172a is adjacent to the first light source 122, and the first modulating light emitting surface 172b is adjacent to the light entering surface IS of the light guide plate 110. In this embodiment, it is defined that a first direction D1 is perpendicular to a direction of the optical axis OA1 of the first light source 122 (the first direction D1 is also perpendicular to a direction of the optical axis OA2 of the second light source 124) and parallel to the direction of the first axis X. A width W2 of the first modulating light emitting surface 172b in the first direction D1 is greater than a width W1 of the first modulating light entering surface 172a in the first direction D1. Specifically, projection segments of the first reflection side surfaces 172c on a plane formed by the first axis X and the second axis Y are inclined, instead of parallel, with respect to the optical axis OA1 of the first light source 122. Moreover, a projection of the first reflection cavity 172 on the plane formed by the first axis X and the second axis Y is line symmetrical on two sides with respect to the optical axis OA1. In this embodiment, the width W1 is in a range from 0.5 millimeters (mm) to 10 mm, for example, and the width W2 is in a range from 5 mm to 30 mm, for example. In addition, a distance D between the first modulating light entering surface 172a and the first modulating light emitting surface 172b in the direction of the second axis Y is in a range from 5 mm to 50 mm, for example. Preferably, the width W1 is in a range from 1.5 mm to 7.5 mm, for example, and the width W2 is in a range from 8 mm to 20 mm, for example. In addition, the distance D between the first modulating light entering surface 172a and the first modulating light emitting surface 172b in the direction of the second axis Y is in a range from 10 mm to 30 mm, for example. In other embodiments, the width W1 of the first modulating light entering surface 172a in the first direction D1, the width W2 of the first modulating light emitting surface 172b in the first direction D1, and the distance between the first modulating light entering surface 172a and the first modulating light emitting surface 172b in the direction of the second axis Y may be adjusted based on the light emitting requirement of the light source module 100, and the invention does not intend to impose any limitation in this regard.

In this embodiment, the first reflection side surfaces 172c of each first reflection cavity 172 are connected to form an enclosed inner surface of the first reflection cavity 172, and the first modulating light entering surface 172a and the first modulating light emitting surface 172b are openings of first reflection cavity 172 at opposite sides. Specifically, a reflection material is attached to the surfaces of the first reflection side surfaces 172c, or a reflection film is coated on the surfaces of the first reflection side surfaces 172c. The reflection material is a silver reflector, for example, or other types of reflectors, and the surface of the first reflection side surface 172c is a mirror reflection surface, for example. However, the invention is not limited thereto. Also, in this embodiment, the first reflection side surfaces 172c are flat surfaces. However, in other embodiments, the first reflection side surfaces 172c may also be curved surfaces. More specifically, after the first light beam L1 emitted by the first light source 122 enters the first reflection cavity 172 from the first modulating light entering surface 172a, the first light beam L1 is reflected back and forth on the first reflection side surfaces 172c to be transmitted toward the first modulating light emitting surface 172b. Generally speaking, when the light beam is transmitted in the reflection cavity, the divergence angle of the light beam may be changed in correspondence with different geometric structures of the reflection cavity. In this embodiment, since the width W2 of the first modulating light emitting surface 172b in the first direction D1 is greater than the width W1 of the first modulating light entering surface 172a in the first direction D1, and the projection segments of the first reflection side surfaces 172c on the plane formed by the first axis X and the second axis Y are inclined, instead of parallel, with respect to the optical axis OA1 of the first light source 122, the divergence angle of the first light beam L1 in the horizontal direction becomes smaller every time when the first light beam L1 having a divergence angle $\theta_1$ in the horizontal direction (i.e., the direction of the first axis X) is reflected on the first reflection side surfaces 172c. In other words, when the first light beam L1 is reflected at least once on the first reflection side surfaces 172c, the original divergence angle $\theta_1$ of the first light beam L1 in the horizontal direction converges due to the first reflection cavity 172, such that the first light beam L1 has a divergence angle $\theta_2$ in the horizontal direction after being emitted from the first modulating light emitting surface 172b and entering the light guide plate 110. In this embodiment, the divergence angle $\theta_2$ is smaller than the divergence angle $\theta_1$.

In this embodiment, the light reflection portion 170 further includes at least one second reflection cavity 174. Each second reflection cavity 174 corresponds to one of the second light source 124. Specifically, each second reflection cavity 174 includes a second modulating light entering surface 174a, a second modulating light emitting surface 174b, and a plurality of second reflection side surfaces 174c connecting the second modulating light entering surface 174a and the second modulating light emitting surface 174b. The second modulating light entering surface 174a is adjacent to the second light source 124, and the second modulating light emitting surface 174b is adjacent to the light entering surface IS of the light guide plate 110. In this embodiment, a width W4 of the second modulating light emitting surface 174b in the first direction D1 is equal to a width W3 of the second modulating light entering surface 174a in the first direction D1. Specifically, projection segments of the second reflection side surface 174c on the plane formed by the first axis X and the second axis Y are parallel with respect to the optical axis OA2 of the second light source 124. Moreover, a projection of the second reflection cavity 174 on the plane formed by the first axis X and the second axis Y is line symmetrical on two sides with respect to the optical axis OA2. In this embodiment, the second reflection side surfaces 174c of each second reflection cavity 174 are connected to foiiii an enclosed inner surface of the second reflection cavity 174, and the second modulating light entering surface 174a and the second modulating light emitting surface 174b are openings of the second reflection cavity 174 at opposite sides. Specifically, similar to the surface of the first reflection side surface 172c, a reflection material is attached to the surfaces of the second reflection side surfaces 174c or a reflection film is coated on the surfaces of the second reflection side surfaces 174c. Relevant descriptions aboutthe reflection material or the reflection film on the second reflection side surface 174c may be referred to the descriptions about the reflection material or the reflection film on the first reflection side surface 172c. Thus, details in this respect will not be repeated in the following.

In this embodiment, since the width W4 of the second modulating light emitting surface 174b in the first direction D1 is equal to the width W3 of the second modulating light entering surface 174a in the first direction D1, and the projection segments of the second reflection side surfaces 174c on the plane formed by the first axis X and the second axis Y are parallel with respect to the optical axis OA2 of the second light source 124, a divergence angle of the second light beam L2 in the horizontal direction does not change when the second light beam L2 having a divergence angle $\theta_3$ in the horizontal direction (i.e., the direction of the first axis) is reflected on the second reflection side surfaces 174c. In other words, when the second light beam L2 is reflected at least once on the second reflection side surfaces 174c, the second reflection cavity 174 substantially maintains the divergence angle of the second light beam L2. Specifically, after being emitted from the second modulating light emitting surface 174b and entering the light guide plate 110, the second light beam L2 has a divergence angle $\theta_4$ in the horizontal direction. In this embodiment, the divergence angle $\theta_3$ is substantially equal to the divergence angle $\theta_4$.

In this embodiment, the first light beam L1 emitted by the first light source 122 and the second light beam L2 emitted by the second light source 124 have substantially the same divergence angle in the horizontal direction. In other words, the divergence angle $\theta_1$ is equal to the divergence angle $\theta_3$. After the first light beam L1 passes through the first reflection cavity 172 and enters the light guide plate 110, the divergence angle of the first light beam L1 in the horizontal direction is the divergence angle $\theta_2$, and the divergence angle $\theta_2$ is smaller than the divergence angle $\theta_1$. In addition, after the second light beam L2 passes through the second reflection cavity 174 and enters the light guide plate 110, the divergence angle of the second light beam L2 in the horizontal direction is the divergence angle $\theta_4$, and the divergence angle $\theta_4$ is substantially equal to the divergence angle $\theta_3$. In this embodiment, when the light beam L passes through the light modulating device 130 and enters the light entering surface IS of the light guide plate 110, the divergence angle of the light beam L in the horizontal direction (i.e., in the direction of the first axis X) is close to the divergence angle of the light beam L in the horizontal direction when the light beam L leaves the light emitting surface ES of the light guide plate 110. Thus, the divergence angle of the first light beam L1 leaving the light guide plate 110 from the light emitting surface ES in the horizontal direction is smaller than the divergence angle of the second light beam L2 leaving the light emitting surface ES of the light guide plate 110 in the horizontal direction.

Referring to FIG. 1B again, in this embodiment, the first reflection cavities 172a and the second reflection cavities 172b are alternately arranged along the first direction D1. Specifically, the first light sources 122 disposed in correspondence with the first reflection cavities 172a and the second light sources 124 disposed in correspondence with the second reflection cavities 174a are also alternately arranged along the first direction D1. In this embodiment, the light source module 100 further includes a processing unit 180. The processing unit 180 is adapted to control the first light sources 122 and the second light sources 124. For example, the light source module 100 has a normal mode and an anti-spy mode. When the light source module 100 is in the normal mode, the processing unit 180 controls the second light sources 124 to emit light, and controls the first light sources 122 not to emit light. The divergence angle $\theta_4$ of the second light beam L2 entering the light guide plate 110 in the horizontal direction is substantially equal to the divergence angle $\theta_3$ in the horizontal direction when the second light beam L2 is emitted from the second light source 124. Thus, the light emitted by the light source module 100 has a divergence angle in the horizontal direction suitable for normal use. Besides, in this embodiment, the processing unit 180 controls the first light sources 122 to emit light and controls the second light sources 124 not to emit light when the light source module 100 is in the anti-spy mode. The divergence angle $\theta_2$ of the first light beam L1 entering the light guide plate 110 in the horizontal direction is substantially smaller than the divergence angle $\theta_1$ in the horizontal direction when the first light beam L1 is emitted from the first light source 122. Thus, the light emitted by the light source module 100 has a smaller divergence angle in the horizontal direction. In other words, when the user is viewing information by using a relevant product where the light source module 100 is applied, such as a display apparatus of a mobile phone, a display frame of the display apparatus is only viewable by the user within a small range of angle in a direction of the display frame of the display apparatus. In other words, in the anti-spy mode, the user is able to normally view the display frame of the display apparatus. However, when an angle of another person with respect to the display apparatus in the direction of the display frame of the display apparatus exceeds a certain degree, he/she is unable to view the display frame of the display apparatus since the light emitted from the light source module 100 is unable to enter the another person's eyes. Thus, the display apparatus has an anti-spy effect.

In this embodiment, based on practical needs, the processing unit 180 may control different first light sources 122 and second light sources 124 when the light source module 100 is in the normal mode or in the anti-spy mode. For example, the processing unit 180 may control the first and second light sources 122 and 124 to emit light when the light source module 100 in the normal mode, such that the light emitted by the light source module 100 has a divergence angle in the horizontal direction suitable for normal use. Also, the brightness near the center of a range of light emission of the light source module 100 in the horizontal direction is higher. Furthermore, in some embodiments, the first reflection cavities 172 and the second reflection cavities 174 may be arranged in the first direction D1 in a different way, such that a different optical effect (e.g. brightness control or control of brightness distribution) or a different outcome of control may be accomplished under the control of the processing unit 180 in different modes. Moreover, in some embodiments, the light reflection portion 170 of the light modulating device 130 may have different numbers of the first reflection cavities 172 and the second reflection cavities 174 based on practical needs. The invention does not intend to impose any limitation in this regard.

Figure 2B:
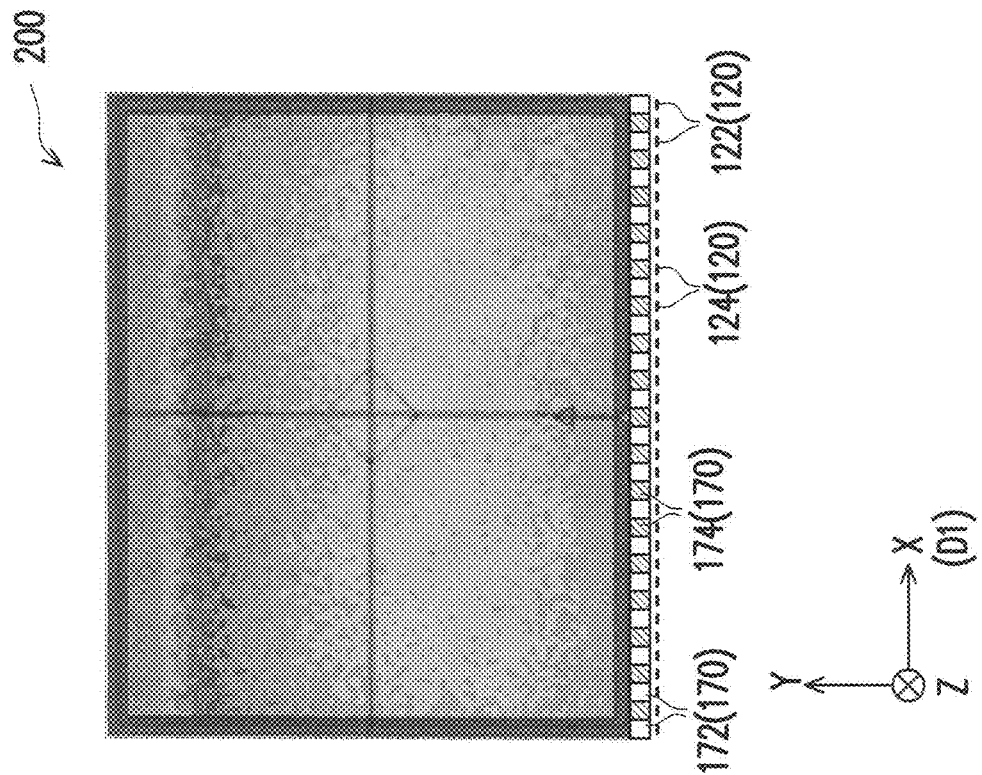
FIG. 2B is a simulation view illustrating an illumination distribution when the light source module according to the embodiment shown in FIG. 2A is in a normal mode.
Figure 2A:
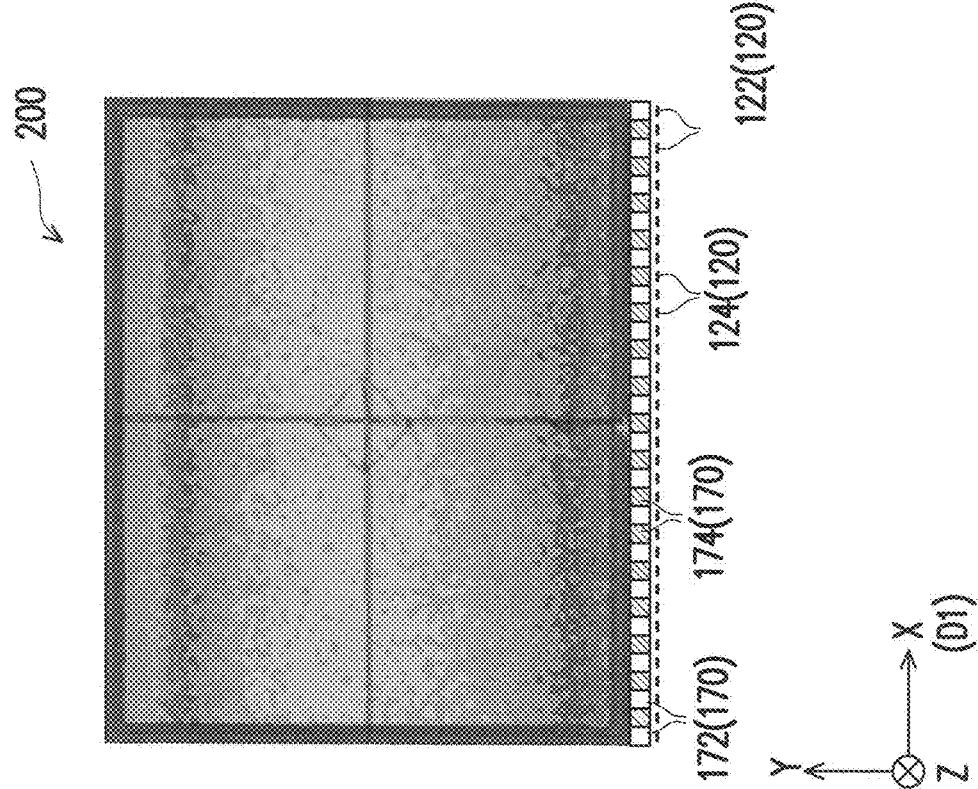
FIG. 2A is a simulation view illustrating an illumination distribution when a light source module according to an embodiment of the invention is in an anti-spy mode.

FIG. 2A is a simulation view illustrating an illumination distribution when a light source module according to an embodiment of the invention is in an anti-spy mode, and FIG. 2B is a simulation view illustrating an illumination distribution when the light source module according to the embodiment shown in FIG. 2A is in a normal mode. Referring to FIGS. 2A and 2B, a light source module 200 of this embodiment is similar to the light source module 100 in the embodiment of FIG. 1A. Thus, the components of the light source module 200 and relevant descriptions may be referred to the light source module 100 in the embodiment of FIG. 1A and will not be repeated in the following. The difference between the light source module 200 of this embodiment and the light source module 100 of the embodiment in FIG. 1A is that the light source module 200 of this embodiment is a 17-inch light source module. The light source module 200 has 18 light emitting diodes as the first light sources 122 and 17 light emitting diodes as the second light sources 124. The light emitting diodes of the first light sources 122 and the light emitting diodes of the second light sources 124 are alternately arranged in the first direction D1, and a pitch between the light emitting diodes is 10 mm. Also, the light source module 200 has the first reflection cavities 172 and the second reflection cavities 174 respectively corresponding to the light emitting devices of the first light sources 122 and the light emitting devices of the second light sources 124.

In the simulation results of the illumination of the light source module in the embodiment of FIGS. 2A and 2B, the distribution of different colors indicates the distribution of the illumination of the light source module 200. In FIGS. 2A and 2B, a lighter color indicates a higher illumination.

Figure 3B:
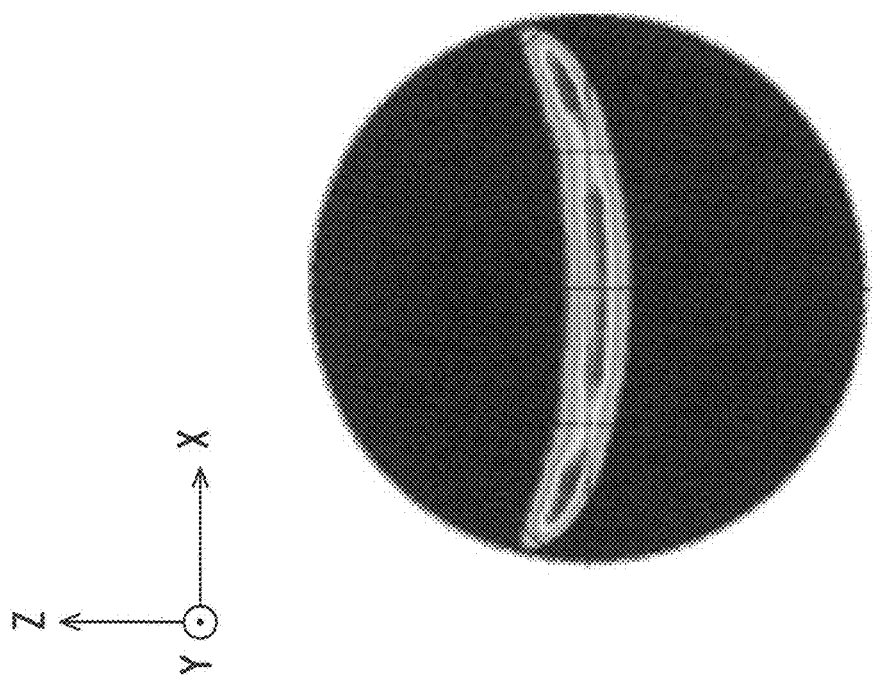
FIG. 3B is a simulation view illustrating a view angle distribution when the light source module according to the embodiment shown in FIG. 2B is in a normal mode.
Figure 3A:
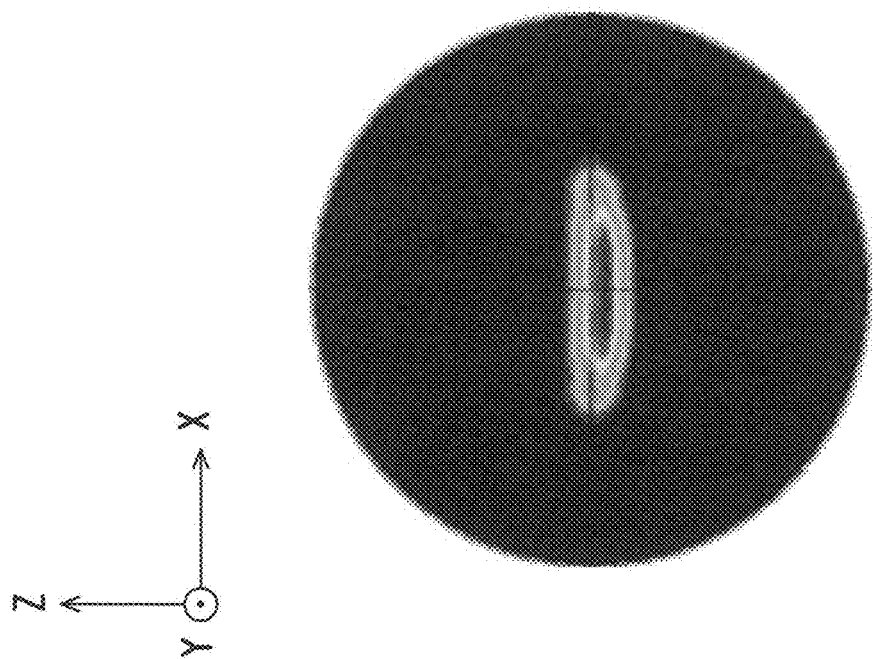
FIG. 3A is a simulation view illustrating a view angle distribution when the light source module according to the embodiment shown in FIG. 2A is in an anti-spy mode.

FIG. 3A is a simulation view illustrating a view angle distribution when the light source module according to the embodiment shown in FIG. 2A is in an anti-spy mode, and FIG. 3B is a simulation view illustrating a view angle distribution when the light source module according to the embodiment shown in FIG. 2B is in a normal mode. In the simulation results of the view angle distribution of the light source module shown in the embodiment FIGS. 3A and 3B, the distribution of different colors indicates the distribution of the view angle of the light source module 200.

It should be noted that the simulation views illustrating the illumination distribution shown in FIGS. 2A and 2B and the simulation views illustrating the view angle distribution shown in FIGS. 3A and 3B are merely provided to describe an embodiment of the invention and shall not be construed as a limitation of the invention. It should be known to people having ordinary skills in the art in the art that suitable modifications and variations, which result in changes in the data of setting, can be made to the structure of the present invention based on the principle of the invention without departing from the scope or spirit of the invention.

FIG. 4A is a schematic cross-sectional top view illustrating a light modulating device according to another embodiment of the invention. Referring to FIG. 4A, in this embodiment, a light modulating device 430a is similar to the light modulating device 130 in the embodiment shown in FIGS. 1A and 1B. Components of the light modulating device 430a and relevant descriptions may be referred to the light modulating device 130 in the embodiment shown in FIGS. 1A and 1B, and will not be repeated in the following. The light modulating device 430a differs from the light modulating device 130 in that the light modulating device 430a includes a light reflection portion 470a. The light reflection portion 470a includes at least one first reflection cavity 472a and at least one second reflection cavity 474a. Each first reflection cavity 472a corresponds to the first light source 122, and each second reflection cavity 474a corresponds to the second light source 124. Specifically, each first reflection cavity 472a includes a first modulating light entering surface 472aa, a first modulating light emitting surface 472ab, and a plurality of first reflection side surfaces 472ac connecting the first modulating light entering surface 472aa and the first modulating light emitting surface 472ab. Each second reflection cavity 474a includes a second modulating light entering surface 474aa, a second modulating light emitting surface 474ab, and a plurality of second reflection side surfaces 474ac connecting the second modulating light entering surface 474aa and the second modulating light emitting surface 474ab. In this embodiment, the first reflection side surfaces 472ac are curved surfaces. Specifically, since the first reflection cavity 472a of the light modulating device 430a makes the divergence angle of the light beam emitted by the first light source 122 converge, a light source module using the light modulating device 430a of this embodiment may also provide the anti-spy effect like the light source module 100 of the embodiment shown in FIGS. 1A and 1B to a display apparatus.

FIG. 4B is a schematic cross-sectional top view illustrating a light modulating device according to yet another embodiment of the invention. Referring to FIG. 4B, in this embodiment, a light modulating device 430b is similar to the light modulating device 130 in the embodiment shown in FIGS. 1A and 1B. Components of the light modulating device 430b and relevant descriptions may be referred to the light modulating device 130 in the embodiment shown in FIGS. 1A and 1B, and will not be repeated in the following. The light modulating device 430b differs from the light modulating device 130 in that the light modulating device 430b includes a light reflection portion 470b. The light reflection portion 470b includes at least one first reflection cavity 472b and at least one second reflection cavity 474b. Each first reflection cavity 472b corresponds to the light emitting device of the first light source 122, and each second reflection cavity 474b corresponds to the light emitting device of the second light source 124. Specifically, each first reflection cavity 472b includes a first modulating light entering surface 472ba, a first modulating light emitting surface 472bb, and a plurality of first reflection side surfaces 472bc connecting the first modulating light entering surface 472ba and the first modulating light emitting surface 472bb. Each second reflection cavity 474b includes a second modulating light entering surface 474ba, a second modulating light emitting surface 474bb, and a plurality of second reflection side surfaces 474bc connecting the second modulating light entering surface 474ba and the second modulating light emitting surface 474bb. In this embodiment, a projection of the first reflection cavity 472b on the plane formed by the first axis X and the second axis Y is not line symmetrical on two sides with respect to the optical axis OA1. In the first direction D1, the first modulating light emitting surface 472bb respectively has a width W5 and a width W6 on the two sides with respect to the optical axis OA1. In addition, the width W5 is greater than the width W6. By adjusting the structure of the first reflection cavity 472b of this embodiment, after passing through the first reflection cavity 472b, the first light beam L1 emitted by the light emitting device of the first light source 122 is emitted, with inclination, into the light guide plate, so as to accomplish a different light emission application. In this embodiment, since the first reflection cavity 472b of the light modulating device 430b makes the divergence angle of the light beam emitted by the light emitting device of the first light source 122 converge, a light source module using the light modulating device 430a of this embodiment may also provide the anti-spy effect like the light source module 100 of the embodiment shown in FIGS. 1A and 1B to a display apparatus.

Figure 5:
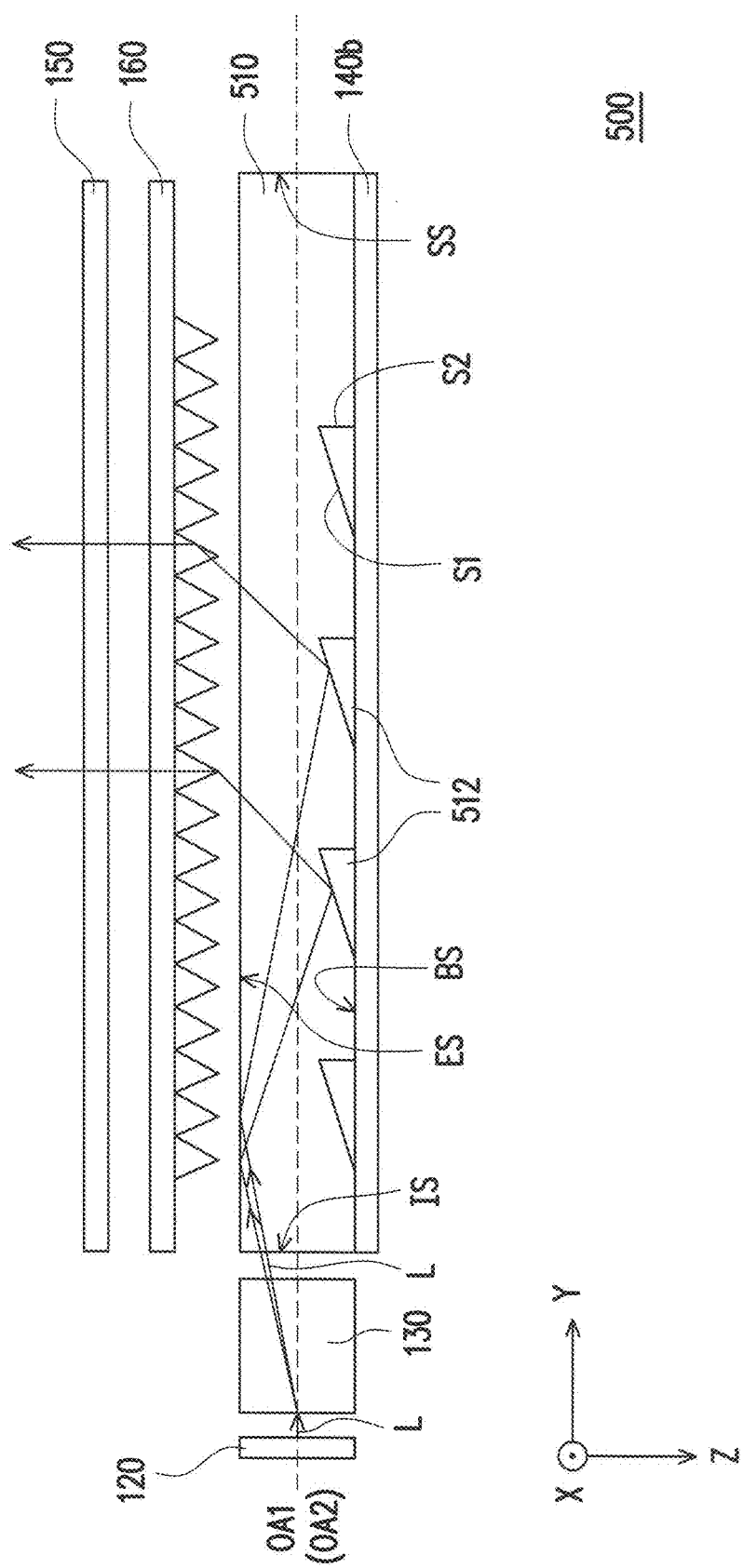
FIG. 5 is a schematic cross-sectional side view illustrating a light source module according to still another embodiment of the invention.

FIG. 5 is a schematic cross-sectional side view illustrating a light source module according to still another embodiment of the invention. Referring to FIG. 5, in this embodiment, a light source module 500 is similar to the light source module 100 in the embodiment shown in FIGS. 1A and 1B. Components of the light source module 500 and relevant descriptions may be referred to the light source module 100 in the embodiment shown in FIGS. 1A and 1B, and will not be repeated in the following. The light source module 500 differs from the light source module 100 in that a plurality of micro-structures 512 are disposed on the bottom surface BS of a light guide plate 510 of the light source module 500. In addition, the light guide plate 510 has a consistent thickness. In this embodiment, the light beam L from the light entering surface IS is transmitted in the light guide plate 510 through total reflection. When the light beam L is transmitted to the micro-structures 512, the light beam L may be reflected at the micro-structures 512 and refracted out of the light guide plate 510 at the light emitting surface ES. Specifically, each micro-structure 512 is a recessed structure recessed inwardly in the bottom surface BS of the light guide plate 510. Each micro-structure 512 has a first surface S1 facing the light emitting surface IS and a second surface S2 facing the side surface SS. In addition, the first surface S1 and the second surface S2 are flat surfaces. Since the first surfaces S1 and the second surfaces S2 of the micro-structures 512 are flat surfaces, the micro-structures 512 do not cause scattering of light. In this embodiment, the divergence angle of the light beam L entering the light entering surface IS through the light modulating device 130 in the horizontal direction (i.e., in the direction of the first axis X) is close to the divergence angle of the light beam L leaving the light emitting surface ES in the horizontal direction. Moreover, since the light modulating device 130 makes the divergence angle of the first light beam (not shown) emitted by the light emitting device of the first light source (not shown) converge, the light source module 500, like the light source module 100 in the embodiment shown in FIGS. 1A and 1B, may provide the anti-spy effect to the display apparatus.

Figure 6A:
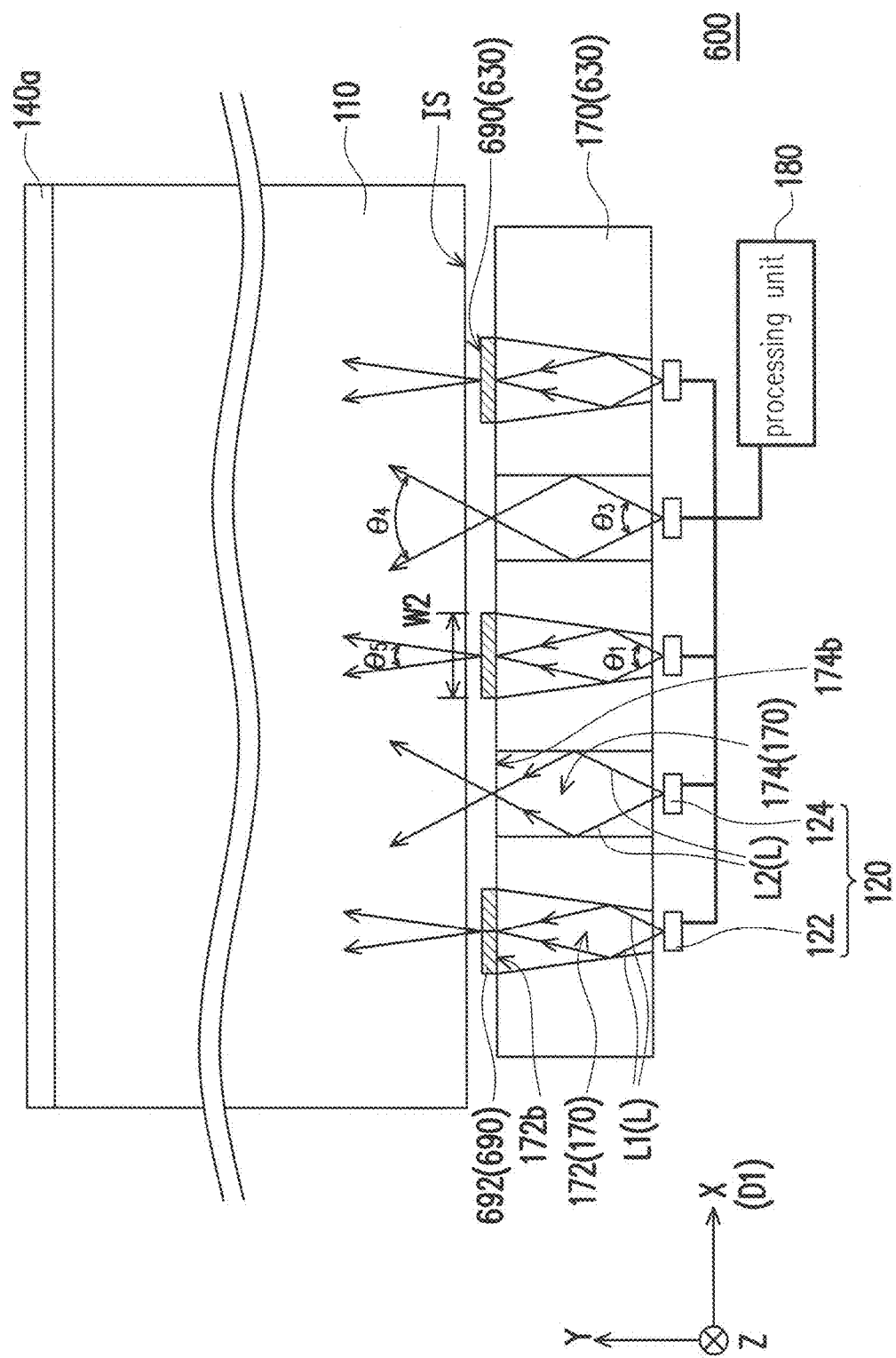
FIG. 6A is a schematic cross-sectional top view illustrating a light source module according to another embodiment of the invention.
Figure 6B:
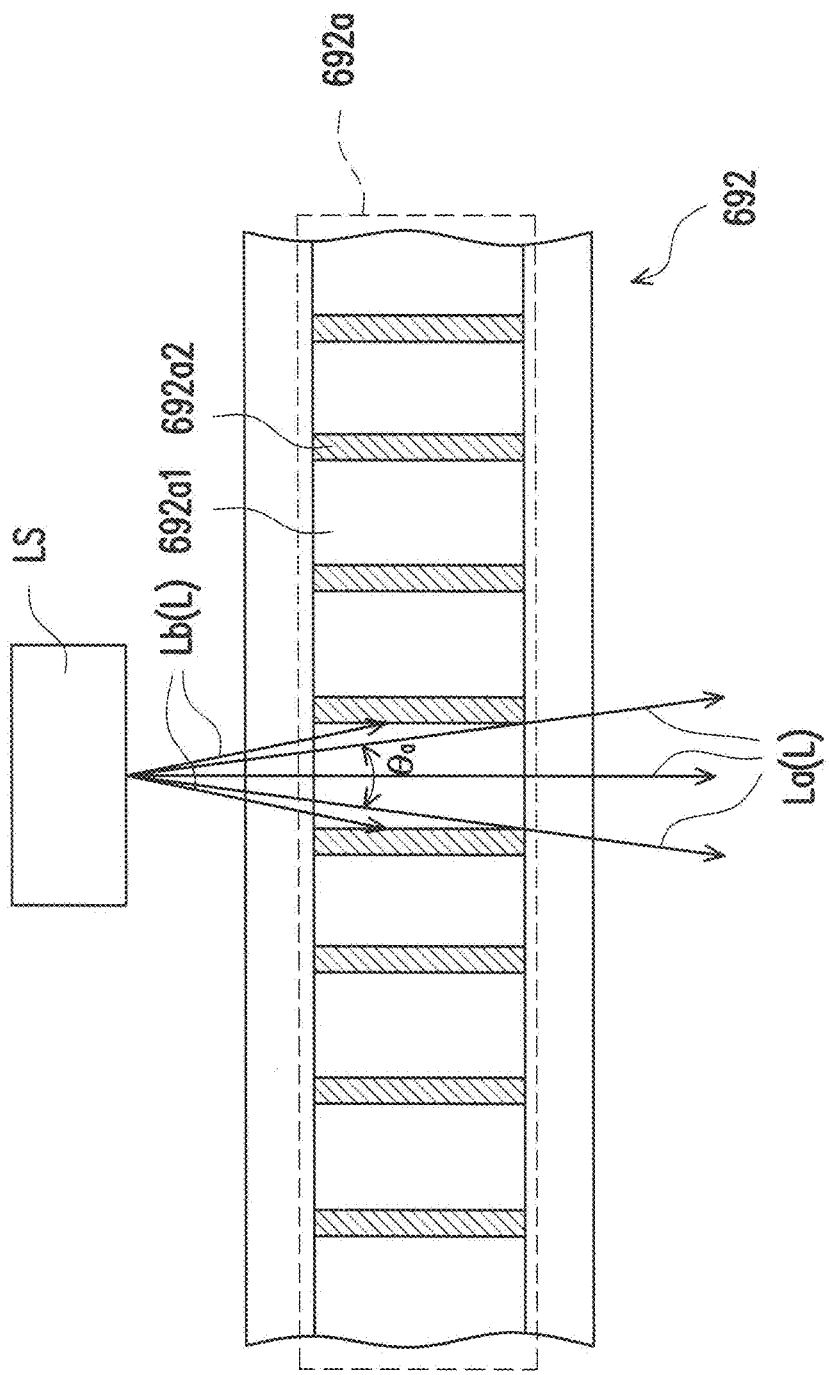
FIG. 6B is a schematic view illustrating a light absorbing device according to the embodiment shown in FIG. 6A absorbing a large angular beam.

FIG. 6A is a schematic cross-sectional top view illustrating a light source module according to another embodiment of the invention, and FIG. 6B is a schematic view illustrating a light filtering device according to the embodiment shown in FIG. 6A filtering a large angular beam. Referring to FIGS. 6A and 6B, in this embodiment, a light source module 600 is similar to the light source module 100 in the embodiment shown in FIGS. 1A and 1B. Components of the light source module 600 and relevant descriptions may be referred to the light source module 100 in the embodiment shown in FIGS. 1A and 1B, and will not be repeated in the following. The light source module 600 differs from the light source module 100 in that a light modulating device 630 of the light source module 600 further includes a light filtering portion 690. The light filtering portion 690 is disposed between the light reflection portion 170 and the light entering surface IS of the light guide plate 110. The light filtering portion 690 includes at least one light filtering device 692. Each light filtering device 692 is disposed in correspondence to each first modulating light emitting surface 172b. Specifically, each light filtering device 692 covers one of the first modulating light emitting surface 172b.

Referring to FIG. 6B, in this embodiment, the light filtering device 692 includes a grating structure 692a. The grating structure 692a includes a plurality of light transmissive units 692a1 and a plurality of light absorbing units 692a2. In addition, the light transmissive units 692a1 and the light absorbing units 692a2 are alternately arranged. Specifically, a light source LS emits the light beam L to the light filtering device 692, and an optical axis of a light source LS is perpendicular to an arrangement direction of the light transmissive units 692a1 and the light absorbing units 692a2. When the light beam L from the light source LS travels to the grating structure 692a, the light beam L may pass through the light transmissive units 692a1. However, the light beam L traveling to the light absorbing units 692a2 may be absorbed by the light absorbing units 692a2. In this embodiment, a portion La of the light beam L whose divergenceangle is smaller than a first angle θa does not travel to the light absorbing units 692a2. Thus, the portion La of the light beam L is able to pass through the light filtering device 692. Also, a portion Lb of the light beam L whose divergence angle is greater than the first angle θa travels to the light absorbing units 692a2. Thus, the portion Lb is unable to pass through the light filtering device 692. In other words, the light filtering device 692 is able to absorb the portion Lb of the light beam L whose divergence angle is greater than the first angle θa. In other embodiments, the grating structure 692a may include a plurality of light reflecting units and the light transmissive units 692a1 in an alternate arrangement. A material of the light reflecting units includes a light reflecting material, such as white resin, metal materials, etc. However, the invention is not limited thereto.

Referring to FIG. 6B as well as FIGS. 1B and 6A, in the embodiment shown in FIG. 1B, the first light beam L1 passing through the first modulating light emitting surface 172b has the divergence angle $\theta_2$. Also, in the embodiment shown in FIG. 6A, the first light beam L1 passing through the light filtering device 692 and entering the light guide plate 110 has a divergence angle $\theta_5$. Based on the embodiment shown in FIG. 6B, the light filtering device 692 is able to filter out the portion of the light beam L whose divergence angle is greater than the first angle $\theta_a$. Therefore, when the first angle $\theta_a$ is smaller than the divergence angle $\theta_2$, in the embodiment of FIG. 6A, the light filtering device 692 is able to filter out the portion of the first light beam L1 passing through the first modulating light emitting surface 172b whose divergence angle is greater than the first angle $\theta_a$. Specifically, the divergence angle $\theta_5$ of the first light beam L1 in the embodiment shown in FIG. 6A is smaller than the divergence angle $\theta_2$ of the first light beam L1 in the embodiment shown in FIG. 1B. In this embodiment, the first reflection cavity 172 of the light modulating device 630 makes the divergence angle of the first light beam L1 emitted by the light emitting device of the first light source 122 converge, and the light filtering device 692 filters out the portion of the first light beam L1 whose divergence angle is greater than the first angle $\theta_a$, so as to further make the divergence angle of the first light beam L1 converge. Thus, the light source module 600, like the light source module 100 in the embodiment shown in FIGS. 1A and 1B, may provide the anti-spy effect to a display apparatus. In some embodiments, the light filtering device 692 may be optionally attached to some of the first modulating light emitting surfaces 172b of the first reflection cavities 172 based on practical needs. Alternatively, the light filtering device 692 may be optionally attached to at least some of the second modulating light emitting surfaces 174b of the second reflection cavities 174, so as to suitably adjust the divergence angle of the second light beam L2. However, the invention does not intend to impose any limitation in this regard.

Figure 7:
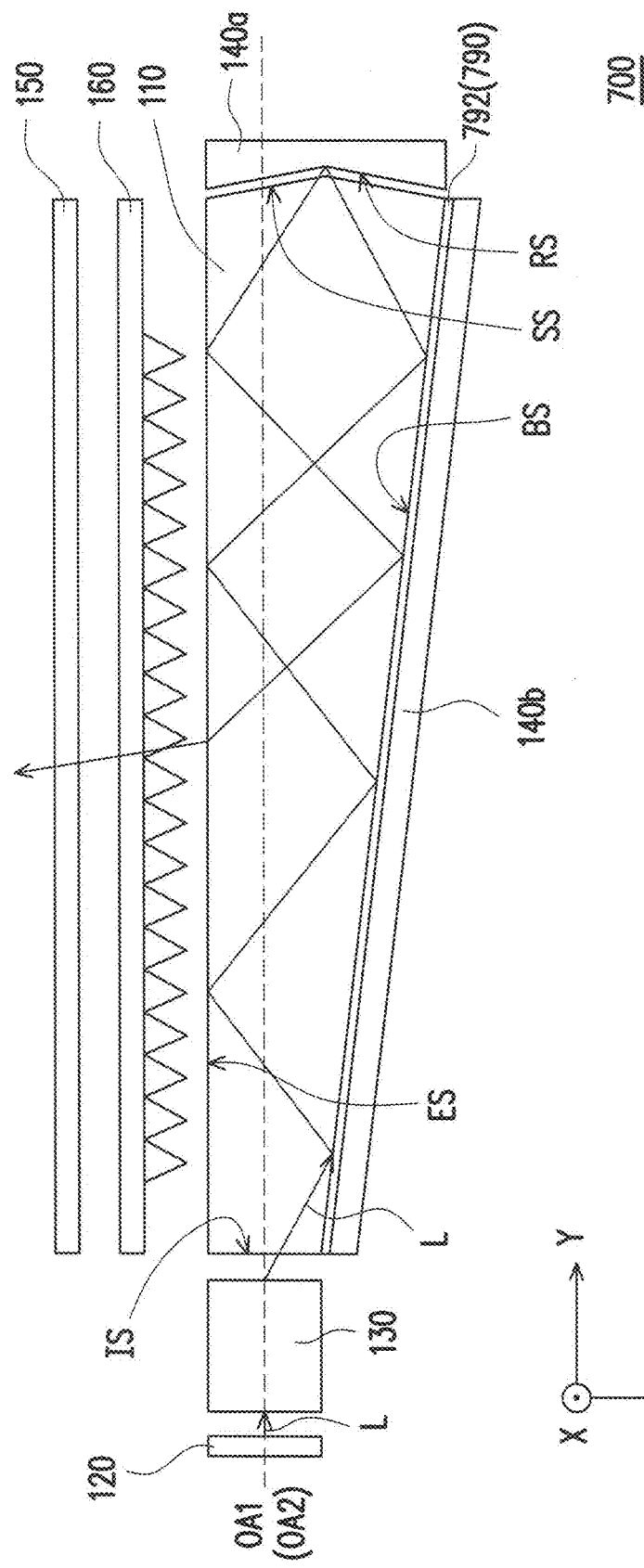
FIG. 7 is a schematic cross-sectional side view illustrating a light source module according to yet another embodiment of the invention.

FIG. 7 is a schematic cross-sectional side view illustrating a light source module according to yet another embodiment of the invention. Referring to FIG. 7, in this embodiment, a light source module 700 is similar to the light source module 100 in the embodiment shown in FIGS. 1A and 1B. Components of the light source module 700 and relevant descriptions may be referred to the light source module 100 in the embodiment shown in FIGS. 1A and 1B, and will not be repeated in the following. The light source module 700 differs from the light source module 100 in that the light source module 700 further includes a light filtering portion 790, and the light filtering portion 790 includes a light filtering device 792. In this embodiment, the reflection device 140b of the light source module 700 is a reflection sheet, for example. The reflection device 140b is disposed below the bottom surface BS, and the light filtering portion 790 is disposed between the bottom surface BS and the reflection device 140b. In this embodiment, the light filtering device 792 is similar to the light filtering device 692 in the embodiment shown in FIGS. 6A and 6B. The components of the light filtering device 792 and relevant descriptions may be referred to the light filtering device 692 in the embodiment shown in FIGS. 6A and 6B and will not be repeated in the following. Specifically, when the light beam L is transmitted through total reflection within the light guide plate 110, even if the incident angle of the light beam L on the bottom surface BS is smaller than the critical angle, a portion of the light beam L may still be reflected to the light emitting surface ES by the reflection device 140b. Also, the portion of the light beam L reflected to the light emitting surface ES by the reflection device 140b may pass through the light filtering device 792. In addition, the light filtering device 792 may absorb the portion of the light beam L whose divergence angle is greater than the first angle $\theta_a$, so as to make the divergence angle of the light beam L converge. In this embodiment, the light modulating device 130 makes the divergence angle of the first light beam (not shown) emitted by the light emitting device of the first light source (not shown) converge. Therefore, the light source module 700, like the light source module 100 in the embodiment shown in FIGS. 1A and 1B, may provide the anti-spy effect to a display apparatus.

Figure 8:
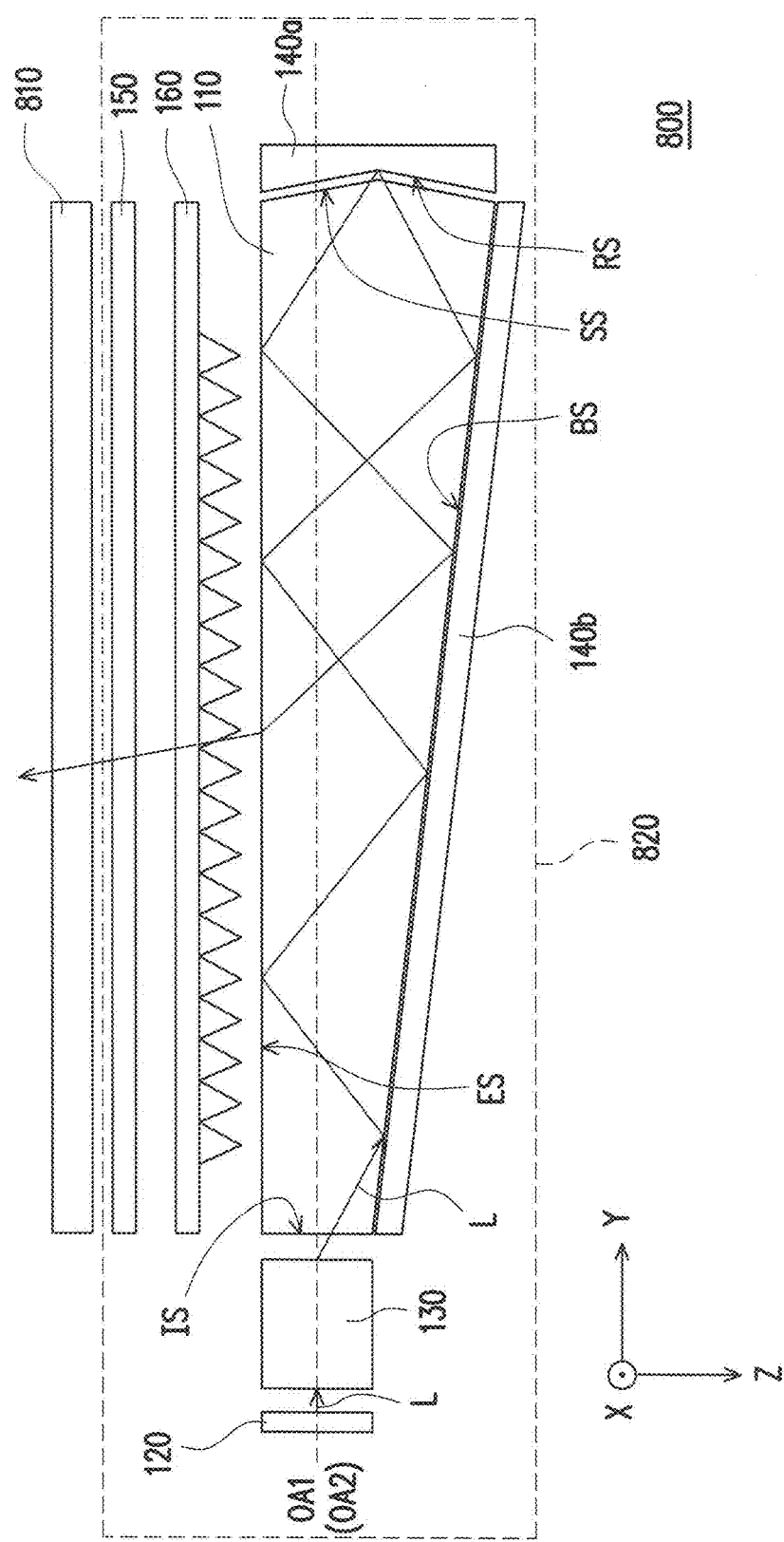
FIG. 8 is a schematic cross-sectional side view illustrating a display apparatus according to an embodiment of the invention.

FIG. 8 is a schematic cross-sectional side view illustrating a display apparatus according to an embodiment of the invention. Referring to FIG. 8, a display apparatus 800 includes a display panel 810 and a light source module 820. The light source module 820 is adapted to provide the light beam L to the display panel 810. Specifically, the light source module 820 is similar to the light source module 100 in the embodiment shown in FIGS. 1A and 1B. Components of the light source module 820 and relevant descriptions may be referred to the light source module 100 in the embodiment shown in FIGS. 1A and 1B, and will not be repeated in the following. In this embodiment, the display panel 810 is a transmissive display panel or other types of display panel, for example. Also, at least the light source module 100 in the embodiment shown in FIGS. 1A and 1B, the light source module 500 in the embodiment shown in FIG. 5, the light source module 600 in the embodiment shown in FIG. 6A, the light source module 700 in the embodiment shown in FIG. 7 may be used as the light source module 820, or other types of light source module may also be used as the light source module 820. The invention does not intend to impose any limitation in this regard. In this embodiment, since the light modulating device 130 makes the divergence angle of the first light beam (not shown) emitted by the light emitting device of the first light source (not shown) converge, the light source module 820, like the light source module 100 in the embodiment shown in FIGS. 1A and 1B, may provide the display apparatus 800 with the anti-spy effect.

In view of the foregoing, the embodiments of the invention at least have one of the following characteristics or effects. In the light source module and the display apparatus according to the embodiments of the invention, the light modulating device includes the light reflection portion. The first light beam emitted by the light source set enters the light entering surface of the light guide plate through the light modulating device, and the light modulating device makes the divergence angle of the first light converge. Thus, the light source module according to the embodiments of the invention may provide the anti-spy effect to a display apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
a light guide plate, comprising a light entering surface;
a light source set, disposed beside the light entering surface, wherein the light source set is adapted to emit a first light beam; and
a light modulating device, disposed between the light source set and the light guide plate and comprising a light reflection portion,
wherein the first light beam passes through the light modulating device and enters the light entering surface, and the light modulating device makes a divergence angle of the first light beam converge,
wherein the light source set comprises a first light source and a second light source, the first light source is adapted to emit the first light beam, the second light source is adapted to emit a second light beam, the second light beam passes through the light modulating device and enters the light entering surface, and the light modulating device substantially maintains a divergence angle of the second light beam.

2. A display apparatus, comprising:
a display panel; and
a light source module, adapted to provide light to the display panel, wherein the light source module comprises:
a light guide plate, comprising a light entering surface;
a light source set, disposed beside the light entering surface, wherein the light source set is adapted to emit a first light beam; and
a light modulating device, disposed between the light source set and the light guide plate and comprising a light reflection portion,
wherein the first light beam passes through the light modulating device and enters the light entering surface, and the light modulating device makes a divergence angle of the first light beam converge,
wherein the light source set comprises a first light source and a second light source, the first light source is adapted to emit the first light beam, the second light source is adapted to emit a second light beam, the second light beam passes through the light modulating device and enters the light entering surface, and the light modulating device substantially maintains a divergence angle of the second light beam.

3. The light source module as claimed in claim 1, wherein the light reflection portion comprises a first reflection cavity, the first reflection cavity comprises a first modulating light entering surface, a first modulating light emitting surface, and a plurality of first reflection side surfaces connecting the first modulating light entering surface and the first modulating light emitting surface, the first modulating light entering surface is adjacent to the first light source, and the first modulating light emitting surface is adjacent to the light entering surface.

4. The light source module as claimed in claim 3, wherein a width of the first modulating light emitting surface in a first direction is greater than a width of the first modulating light entering surface in the first direction, and the first direction is perpendicular to a direction of an optical axis of the first light source.

5. A light source module, comprising:
a light guide plate, comprising a light entering surface;
a light source set, disposed beside the light entering surface, wherein the light source set comprises a first light source, the first light source is adapted to emit the first light beam; and
a light modulating device, disposed between the light source set and the light guide plate and comprising a light reflection portion, the light reflection portion comprises a first reflection cavity, the first reflection cavity comprises a first modulating light entering surface, a first modulating light emitting surface, and a plurality of first reflection side surfaces connecting the first modulating light entering surface and the first modulating light emitting surface, the first modulating light entering surface is adjacent to the first light source, and the first modulating light emitting surface is adjacent to the light entering surface, a width of the first modulating light emitting surface in a first direction is greater than a width of the first modulating light entering surface in the first direction, and the first direction is perpendicular to a direction of an optical axis of the first light source, wherein the light reflection portion further comprises a second reflection cavity, the second reflection cavity comprises a second modulating light entering surface, a second modulating light emitting surface, and a plurality of second reflection side surfaces connecting the second modulating light entering surface and the second modulating light emitting surface, the second modulating light entering surface is adjacent to the light source set, the second modulating light emitting surface is adjacent to the light entering surface, and a width of the second modulating light emitting surface in the first direction is equal to a width of the second modulating light entering surface in the first direction, wherein the first light beam passes through the light modulating device and enters the light entering surface, and the light modulating device makes a divergence angle of the first light beam converge.

6. The light source module as claimed in claim 5, wherein the light source set further comprises a second light source, the second light source is adapted to emit a second light beam, the second modulating light entering surface is adjacent to the second light source, the second light beam passes through the second reflection cavity and enters the light entering surface, and the light modulating device substantially maintains a divergence angle of the second light beam.

7. The light source module as claimed in claim 5, wherein the first reflection cavity and the second reflection cavity are alternately arranged along the first direction.

8. The light source module as claimed in claim 3, wherein the modulating device further comprises a light filtering portion, the light filtering portion is disposed between the light reflection portion and the light entering surface, the light filtering portion comprises a light filtering device, the light filtering device is disposed in correspondence with the first modulating light emitting surface and filters out a portion of the first light beam whose divergence angle is greater than a first angle.

9. The light source module as claimed in claim 3, wherein the light guide plate comprises a light emitting surface and a bottom surface opposite to the light emitting surface, the light entering surface is located between the light emitting surface and the bottom surface and connects the light emitting surface and the bottom surface, the light source module further comprises a light filtering portion and a reflection device, the reflection device is disposed below the bottom surface, and the light filtering portion is disposed between the bottom surface and the reflection device.

* * * * *